(12) United States Patent
Tsuchiya

(10) Patent No.: US 10,863,070 B2
(45) Date of Patent: Dec. 8, 2020

(54) FLASH CONTROL DEVICE, FLASH CONTROL METHOD, FLASH, IMAGE CAPTURE APPARATUS, AND IMAGE CAPTURE SYSTEM

(71) Applicant: CANON KABUSHIKI KAISHA, Tokyo (JP)

(72) Inventor: Takuo Tsuchiya, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 40 days.

(21) Appl. No.: 16/395,696

(22) Filed: Apr. 26, 2019

(65) Prior Publication Data
US 2019/0349505 A1 Nov. 14, 2019

(30) Foreign Application Priority Data
May 8, 2018 (JP) .................. 2018-090108

(51) Int. Cl.
*H04N 5/225* (2006.01)
*H04N 5/232* (2006.01)
*H04N 5/235* (2006.01)
*H04N 21/478* (2011.01)
*H04N 21/462* (2011.01)

(52) U.S. Cl.
CPC ......... *H04N 5/2256* (2013.01); *H04N 5/2353* (2013.01); *H04N 5/23245* (2013.01); *H04N 21/4622* (2013.01); *H04N 21/478* (2013.01)

(58) Field of Classification Search
CPC ....... H04N 2005/44578; H04N 5/2256; G03B 7/16
USPC ............................................................ 396/173
See application file for complete search history.

(56) References Cited

U.S. PATENT DOCUMENTS

| 5,815,742 A * | 9/1998 | Hamada ................ G05B 19/19 318/466 |
| 2015/0195445 A1* | 7/2015 | Watanabe .......... H04N 5/23209 348/211.2 |

FOREIGN PATENT DOCUMENTS

JP    2010-185961 A    8/2010

* cited by examiner

*Primary Examiner* — Clayton E. LaBalle
*Assistant Examiner* — Dennis Hancock
(74) *Attorney, Agent, or Firm* — Venable LLP

(57) ABSTRACT

A flash control device repeatedly informs a firing timing during an exposure period of the image capture apparatus. The device stops informing the firing timing if a condition for ending the exposure period of an image capture apparatus is satisfied. The disclosed flash control device can control the firing timing even in a case where a shooting mode of the image capture apparatus is a shooting mode with an indefinite exposure period.

13 Claims, 10 Drawing Sheets

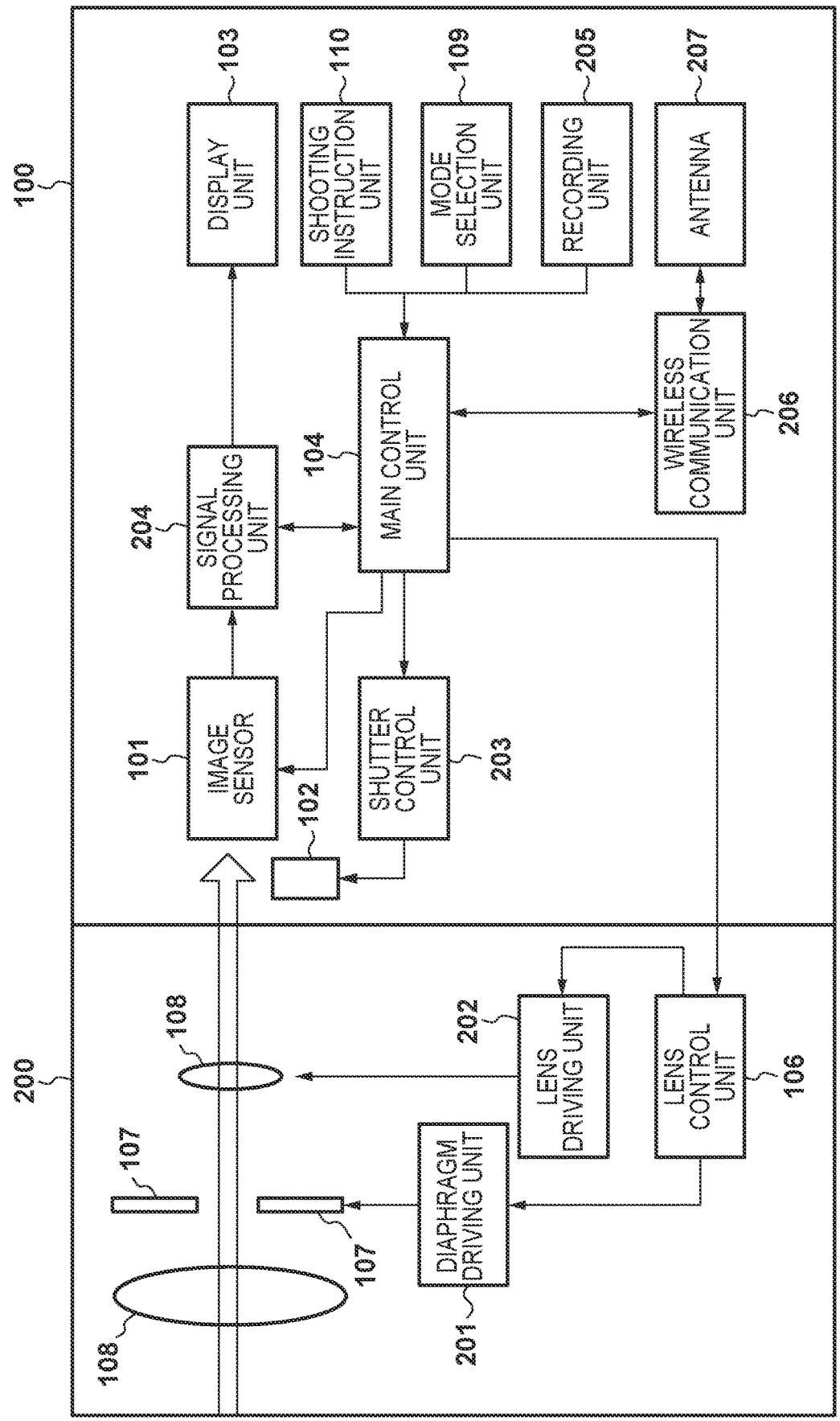

FLASH CONTROL DEVICE, FLASH CONTROL METHOD, FLASH, IMAGE CAPTURE APPARATUS, AND IMAGE CAPTURE SYSTEM

BACKGROUND OF THE INVENTION

Field of the Invention

The present invention relates to a flash control device, a flash control method, a flash, an image capture apparatus, and an image capture system, and more particularly to a flash control technique that uses wireless communication.

Description of the Related Art

Flashlight devices (wireless flash) that are wirelessly connected to an image capture apparatus are conventionally known. A wireless flash is advantageous in being easier to install than a flash connected by cable. The downside is having to deal with lower reliability and greater delay than with wired communication.

In Japanese Patent Laid-Open No. 2010-185961, communication reliability is secured by transmitting timing information that instructs a firing timing from the image capture apparatus to the wireless flash a plurality of times. Also, the firing timing that is instructed differs for each piece of timing information, such that the wireless flash is fired at the same timing whichever of the plurality of pieces of timing information the firing is based on.

Front curtain firing synchronization and rear curtain firing synchronization can be realized with the method disclosed in Japanese Patent Laid-Open No. 2010-185961, by instructing the firing timing with consideration for factors such as the delay inherent in communication and the shutter operation timing, as long as the shutter speed or exposure period is determined before shooting. However, in the case where the shutter speed or the exposure period is not determined before shooting, the timing of rear curtain firing synchronization cannot be realized with precision.

For example, in bulb shooting that allows the user to end the exposure period at an arbitrary timing, the end timing of the exposure period cannot be specified until a user operation ending the exposure period is detected. In the case where transmission of timing information is started at the point in time at which the user operation ending the exposure period is detected, the flash is fired after the flash receives the timing information, and operation of the rear curtain cannot be started until the camera is informed that firing is completed. Also, in the case where the flash does not receive the first timing information, the firing timing of the flash and the start of the rear curtain operation are further delayed. The lag between the exposure period intended by the user and the actual exposure period can no longer be disregarded when the delay increases.

SUMMARY OF THE INVENTION

The present invention has been made in order to at least ameliorate such problems with the conventional technology. An advantage of some aspects of the invention is to provide a flash control device and control method, an image capture apparatus and an image capture system that are able to precisely control the firing timing of a flash in shooting that has an indefinite exposure period.

According to an aspect of the present invention, there is provided a flash control device for controlling a flash according to exposure of an image capture apparatus, comprising: a wireless communication interface; one or more processors that executes a program stored in a memory and, when executing the program, operates as: a transmitting unit configured to inform the flash of a firing timing via the wireless communication interface; and a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied.

According to another aspect of the present invention, there is provided an image capture apparatus comprising: a flash control device; and a driving circuitry that drives a front curtain and a rear curtain of a shutter, wherein the flash control device comprises: a wireless communication interface; one or more processors that executes a program stored in a memory and, when executing the program, operates as: a transmitting unit configured to inform the flash of a firing timing via the wireless communication interface; and a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied, and wherein the driving circuitry drives, after the controlling unit stops informing of the firing timing, the rear curtain and causes the exposure period to end.

According to a further aspect of the present invention, there is provided a flash comprising: a light emitting device; a wireless communication interface; and one or more processors that executes a program stored in a memory and, when executing the program, operates as a firing control unit configured to control operations of the light emitting device, wherein the firing control unit causes clocking processing to start whenever a notification of firing timing is received via the wireless communication interface, and causes the light emitting device to emit light when a time corresponding to the firing timing elapses.

According to another aspect of the present invention, there is provided an image capture system comprising an image capture apparatus and a flash that are connected in a wireless communicable manner, wherein: the image capture apparatus comprising: a flash control device; and a driving circuitry that drives a front curtain and a rear curtain of a shutter, wherein the flash control device comprises: a wireless communication interface; one or more processors that executes a program stored in a memory and, when executing the program, operates as: a transmitting unit configured to inform the flash of a firing timing via the wireless communication interface; and a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied, and wherein the driving circuitry drives, after the controlling unit stops informing of the firing timing, the rear curtain and causes the exposure period to end, and the flash comprising: a light emitting device; a wireless communication interface; and one or more processors that executes a program stored in a memory and, when executing the program, operates as a firing control unit configured to control operations of the light emitting device, wherein the firing control unit causes clocking processing to start whenever a notification of firing timing is received via the wireless communication interface, and causes the light emitting device to emit light when a time corresponding to the firing timing elapses.

According to a further aspect of the present invention, there is provided a flash control method for controlling a flash according to exposure of an image capture apparatus, comprising: determining if a shooting mode of the image capture apparatus is a shooting mode with an indefinite exposure period; and in a case where a shooting mode of the image capture apparatus is a shooting mode with an indefinite exposure period: repeatedly informing the flash of a firing timing by wireless communication during an exposure period of the image capture apparatus; and stopping informing of the firing timing when a condition for ending the exposure period of the image capture apparatus is satisfied.

Further features of the present invention will become apparent from the following description of exemplary embodiments with reference to the attached drawings.

BRIEF DESCRIPTION OF THE DRAWINGS

FIG. 2 is a diagram relating to the interchangeable lens digital camera according to the embodiment.

DESCRIPTION OF THE EMBODIMENTS

First Embodiment

Exemplary embodiments of the present invention will now be described in detail in accordance with the accompanying drawings. It should be noted that the present invention is not limited to the embodiments that will now be described. Also, not all of the constituent elements that are described in the embodiments are necessarily essential to the present invention. The individual functional blocks in the embodiments can be realized by hardware, software or a combination of hardware and software. Also, one functional block may be realized by a plurality of pieces of hardware. Also, one piece of hardware may realize a plurality of functional blocks. Also, one or more functional blocks may be realized by one or more programmable processors (CPU, MPU, etc.) executing computer programs loaded in memory.

In the case of realizing one or more functional blocks with hardware, the functional blocks can be realized by a discrete circuit or an integrated circuit such as an FPGA or ASIC.

Note that the following describes a configuration in which the present invention is applied to an interchangeable lens digital camera which is an example of a flash control device according to the present invention. However, it is also possible to apply the present invention to any electronic device having an image capture function or capable of communicating with an image capture apparatus, including a fixed lens digital camera. Such electronic devices include, for example, image capture apparatuses, flashes, personal computers, smartphones, tablet terminals and game machines, but are not limited thereto.

Figure 1A:
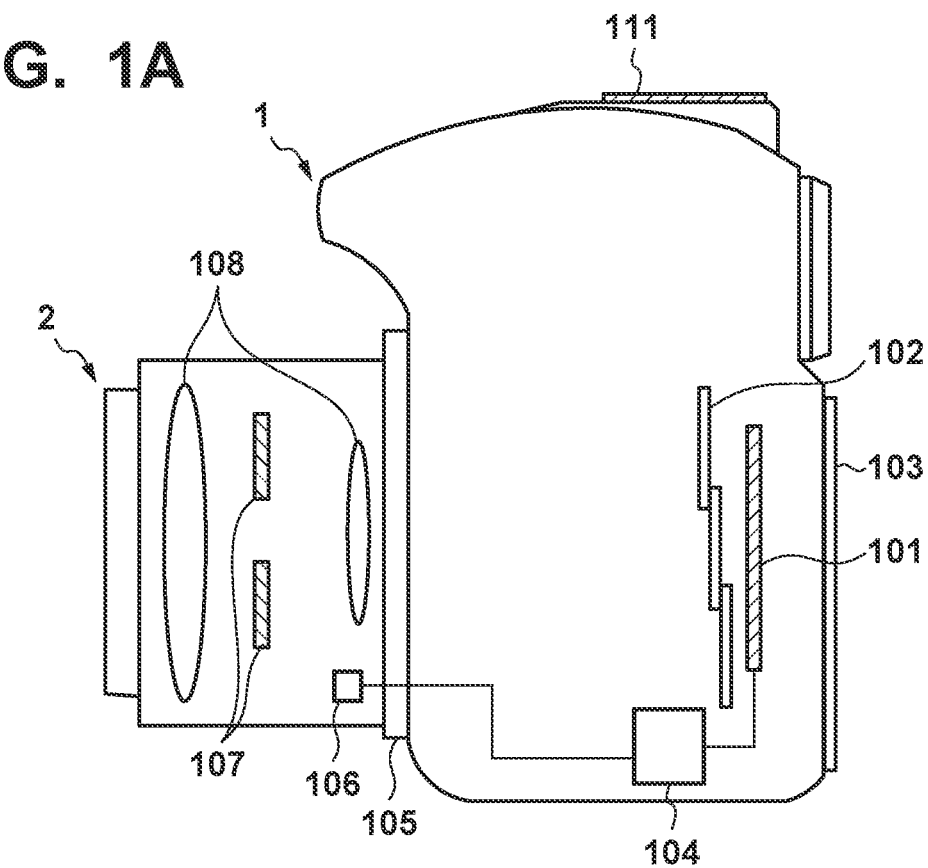
FIGS. 1A and 1B are diagrams relating to an interchangeable lens digital camera according to an embodiment.
Figure 1B:
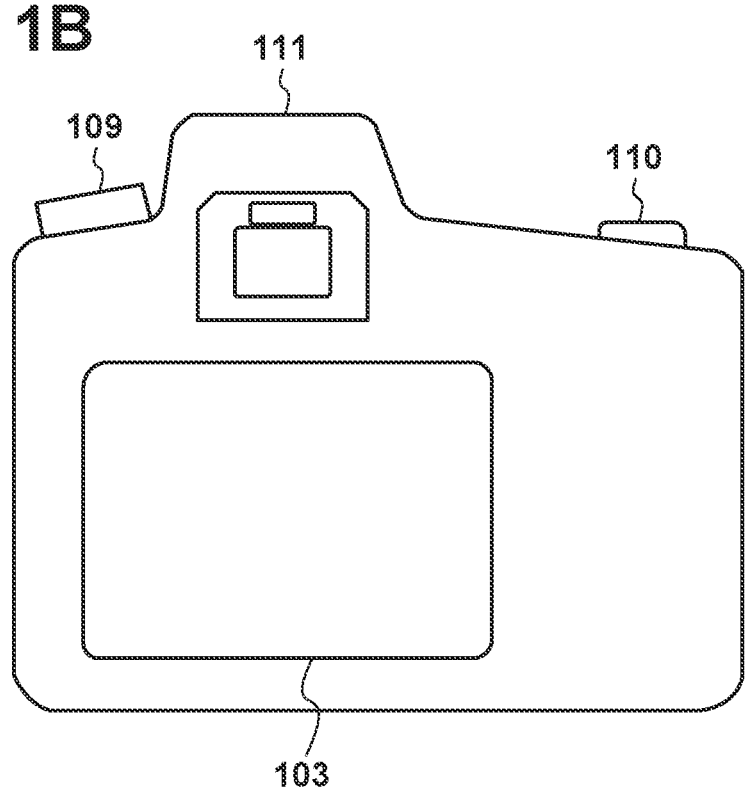

FIGS. 1A and 1B are a schematic vertical cross-sectional view (vertical cross-section containing the optical axis) and rear view of a digital camera (hereinafter, simply "camera") 1 serving as an image capture apparatus according to the embodiment. Note that FIGS. 1A and 1B show constituent elements of the configuration of the camera 1 that are required in describing the embodiments.

The camera 1 and a taking lens 2 are connected via a mount 105, and the taking lens 2 is an interchangeable lens that is removable from the camera 1. The taking lens 2 has a lens group 108, and forms an optical image of an object on an image plane of an image sensor 101.

The image sensor 101 is a CMOS image sensor, for example, and has a plurality of photoelectric conversion elements arrayed two-dimensionally. The image sensor 101 converts the optical image formed by the taking lens 2 into electrical signals (image signals) with the plurality of photoelectric conversion elements. The quantity (voltage value) of the electrical signals with respect to the same amount of received light can be changed, by changing the sensitivity of the image sensor 101.

A shutter 102 is disposed in front of the image sensor 101, and has a front curtain and a rear curtain that travel up and down. The front curtain and the rear curtain are also respectively called the first curtain and the second curtain. When a state in which the optical path is blocked is referred to as fully closed, and a state in which optical path is open is referred to as fully open, exposure of the image sensor 101 starts when the front curtain is fully opened in a state where the rear curtain is fully open and the front curtain is fully closed. Thereafter, exposure of the image sensor 101 ends when the rear curtain is closed after a predetermined time period elapses. When the exposure time is short, travel of the rear curtain is started before the front curtain is fully open, and the image sensor 101 is exposed through a slit-shaped opening that is formed between the front curtain and the rear curtain.

A main control unit 104 has a programmable processor (CPU, etc.) and a memory, for example, and controls operations of the camera 1 and the taking lens 2, including flash control operations described below, as a result of the processor loading programs stored in a nonvolatile memory into the memory and executing the programs.

A lens control unit 106 of the taking lens 2 has a programmable processor (CPU, etc.) and a memory, for example, and controls the operations of the taking lens 2, as a result of the processor loading programs stored in a nonvolatile memory into the memory and executing the programs. The operations of the taking lens 2 include driving a diaphragm 107, driving a moving lens that is included in the lens group 108, and communicating with the main control unit 104. The moving lens includes a focus lens and a magnification lens. The lens control unit 106 is capable of communicating with the main control unit 104 through the mount 105, and performs processing such as controlling the operations of the taking lens 2 according to requests and instructions from the main control unit 104 and transmitting information of the taking lens 2 to the main control unit 104.

The main control unit 104 is able to execute automatic exposure control (AE) for determining exposure control values (aperture, shutter speed, photographic sensitivity), based on luminance information of an image shot with the image sensor 101, for example. Also, the main control unit 104 is able to execute automatic focusing (AF) for controlling the in-focus distance of the taking lens 2 to focus on a predetermined area within an image capture range, based on contrast information of an image shot with the image sensor 101. Note that a configuration for the main control unit 104 to realize AE and AF is not limited thereto, and any known configuration can be used, such as a configuration using a sensor for AE or a sensor for AF.

A display unit 103 is a liquid crystal display, an organic EL display or the like, and performs processing such as displaying images shot with the image sensor 101, displaying information of the camera 1 (various types of settings, remaining battery, number of recordable images, etc.) and displaying GUIs. The display unit 103 may be a touch display.

A mode selection unit 109 is a manually-operable device for selecting a shooting mode of the camera 1. The shooting modes are methods of setting the exposure control value, and include an aperture priority mode, a shutter speed priority mode, a program mode and an auto mode. Also, shooting modes for setting exposure control values suitable for specific objects and situations such as photographing moving objects or photographing people may be included.

A shooting instruction unit 110 (shutter button) has a switch SW1 that turns on in a half-pressed state and a switch SW2 that turns on in a fully-pressed state. The main control unit 104 recognizes the half-pressed state (switch SW1 is ON) as a shooting preparation instruction and the fully-pressed state (switch SW2 is ON) as a shooting start instruction. When the shooting preparation instruction is recognized, the main control unit 104 executes AE and AF. Also, when the shooting start instruction is recognized, the main control unit 104 starts execution of still image shooting processing including driving the shutter 102 and controlling lighting of the flash.

The manually-operable devices of the camera 1, including the mode selection unit 109 and the shooting instruction unit 110, are electrically connected to the main control unit 104. The main control unit 104 monitors the state of each manually-operable device, and, when a change in the state of a manually-operable device is detected, executes an operation that depends on the detected change.

In the case where a long exposure mode (bulb shooting mode) is selected as the shooting mode using the mode selection unit 109, the main control unit 104 drives the shutter 102 when the shooting start instruction is recognized, and exposes the image sensor 101 by fully opening the front curtain and the rear curtain. While the shooting start instruction continues to be recognized, the main control unit 104 continues exposure of the image sensor 101. When the shooting start instruction is no longer recognized, the main control unit 104 ends exposure of the image sensor 101 by fully closing the front curtain and the rear curtain of the shutter 102. In other shooting modes, the main control unit 104 controls the exposure time of the image sensor 101 by automatic exposure control or in accordance with a shutter speed set by the user.

A flash mounting unit 111 is a so-called hot shoe, and mechanically and electrically connects an external flash. A flash mounted to the flash mounting unit 111 is capable of communicating with the main control unit 104, and the settings and operations of the flash can be controlled by the main control unit 104.

FIG. 2 is a block diagram showing an exemplary functional configuration of the camera 1 shown in FIGS. 1A and 1B. The same reference numerals are given to constituent elements shown in FIGS. 1A and 1B, and redundant description is omitted.

A diaphragm driving unit 201 is a motor or actuator for driving the diaphragm 107 of the taking lens 2, and drives the diaphragm 107 and adjusts the size of the opening of the diaphragm 107 in accordance with control by the lens control unit 106.

A lens driving unit 202 is a motor or actuator for driving the moving lens included in the lens group 108 of the taking lens 2, and drives the moving lens and adjusts the in-focus distance and the focal length (angle of view) of the taking lens 2 in accordance with control by the lens control unit 106.

A shutter control unit 203 is a circuitry including a motor, a spring and the like for driving the front curtain and rear curtain of the shutter 102, and performs processing such as executing shutter charge and causing the shutter curtains to travel in accordance with control by the main control unit 104.

A signal processing unit 204 applies various processing to image signals that are output by the image sensor 101, such as denoising, white balance adjustment, color interpolation, various types of correction, resolution conversion, and generation of evaluation values to be used in AF and AE. The signal processing unit 204 performs processing such as generating image signals for use in display and outputting the signals to the display unit 103, and generating image data files for use in recording and outputting the image data files to the main control unit 104. The signal processing unit 204 also performs processing such as detecting the area of an object determined in advance such as a person's face and detecting the movement of an object. The signal processing unit 204 also encodes and decodes image data as needed.

A recording unit 205 is a memory card, for example, and the main control unit 104 records image data files for use in recording acquired from the signal processing unit 204 to the recording unit 205. The recording format and the format of the image data files are determined in advance.

A wireless communication unit 206 is an interface circuit including a wireless transceiver and performs wireless communication with a flash 3 described later via an antenna 207. The main control unit 104 controls the firing timing of the flash 3, by wireless communication through the wireless communication unit 206 and the antenna 207.

Figure 3A:
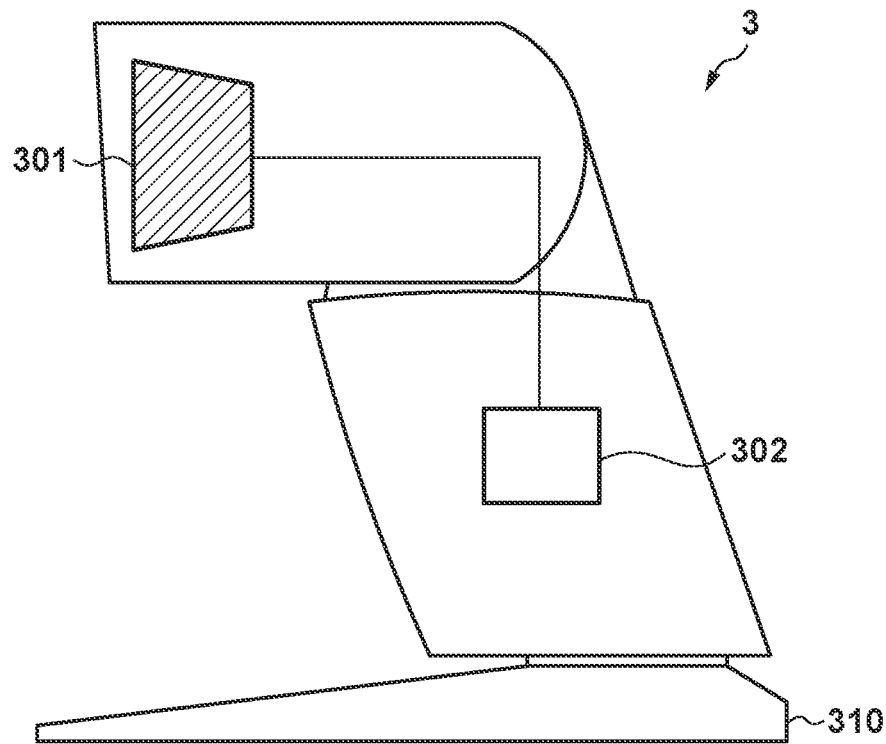
FIGS. 3A and 3B are diagrams relating to a wireless flash according to the embodiment.
Figure 3B:
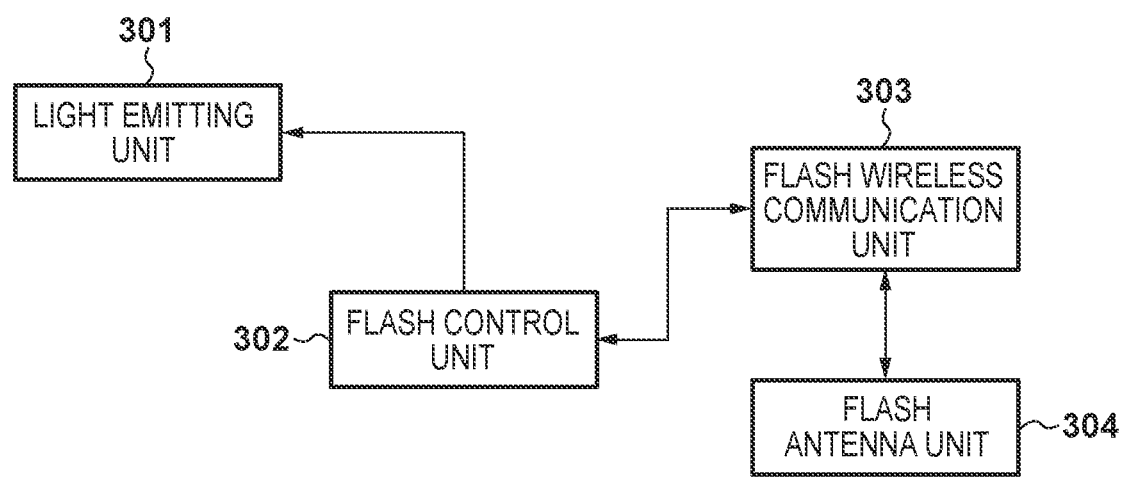

FIG. 3A is a vertical cross-sectional view showing an exemplary schematic configuration of the flash 3 capable of wireless communication with the camera 1, and FIG. 3B is a block diagram showing an exemplary schematic functional configuration of the flash 3. Both diagrams show some of the constituent elements of the flash 3.

A light emitting unit 301 is a device comprising a flashlight lamp, a capacitor and the like, and emits light in accordance with control by a flash control unit 302.

The flash control unit 302 has a programmable processor (CPU, etc.) and a memory, for example, and controls the operations of the flash 3, as a result of the processor loading programs stored in a nonvolatile memory into the memory and executing the programs. The flash control unit 302 controls the firing timing of the light emitting unit 301 and the amount of light emission, based on an instruction from an external device or an instruction received through a manually-operable device, for example.

A stand 310 is a support member for allowing the flash 3 to self-stand. The stand 310 has a configuration that supports a hot shoe connection unit of the flash 3.

A flash wireless communication unit 303 is an interface circuit including a wireless transceiver and performs wireless communication with the camera 1 via a flash antenna unit 304. The flash control unit 302 receives information (instructions) for controlling the firing timing and the amount of light emission from the camera 1 via the flash wireless communication unit 303 and the flash antenna unit 304.

There is no particular limitation on the wireless communication method of the camera 1 and the flash 3, and, in the present embodiment, radio-wave wireless communication that uses the 2.4 GHz band is used. Hereinafter, description relating to operations of an image capture system formed by the camera 1 and the flash 3 being connected in a wirelessly communicable manner will be given.

Figure 4:
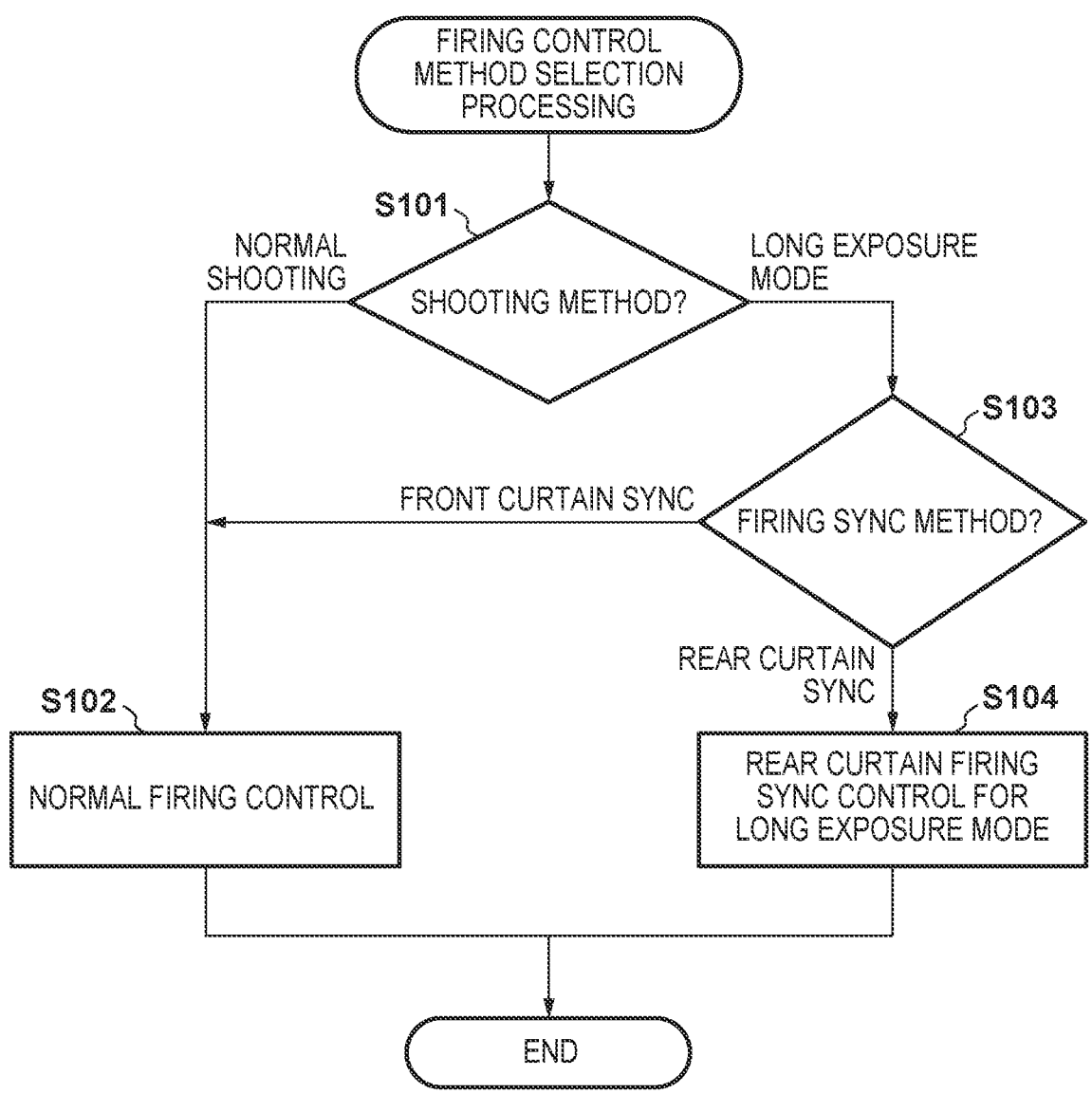
FIG. 4 is a flowchart relating to firing control method selection processing according to the embodiment.

FIG. 4 is a flowchart relating to processing for selecting a firing control method to be implemented by the main control unit 104. This processing can be executed at any timing before the shooting start instruction is recognized.

In step S101, the main control unit 104 confirms the shooting method. Specifically, the main control unit 104 confirms whether the shooting mode that is set is a shooting mode in which shooting with an indefinite exposure period is performed or another shooting mode. Here, the shooting mode in which shooting with an indefinite exposure period is performed will be referred to as a long exposure mode (bulb shooting mode), and shooting modes other than the bulb shooting mode will be collectively referred to as normal shooting modes. Note that information of the shooting modes is assumed to be stored in the memory within the main control unit 104, for example, and updated as needed.

The main control unit 104 advances the processing to step S103 if the bulb shooting mode is set and to step S102 if a normal shooting mode is set.

In step S102, the main control unit 104 determines to perform normal front curtain or rear curtain firing synchronization control, according to the shooting mode, and ends the processing. In the normal shooting modes, the start and end timing of the exposure period can be determined before shooting, and thus front curtain and rear curtain firing synchronization control is performed with an existing method.

On the other hand, in step S103, the main control unit 104 confirms which of front curtain firing synchronization and rear curtain firing synchronization is set, by referring to the memory included in the main control unit 104. If front curtain firing synchronization is set, the main control unit 104 advances the processing to step S102, determines to perform front curtain firing synchronization control with an existing method, and ends the processing. If the rear curtain firing synchronization is set, the main control unit 104 advances the processing to step S104, and determines to perform rear curtain firing synchronization control for use in long exposure.

Rear Curtain Firing Synchronization Control at Time of Long Exposure

Next, the operations of the camera 1 and the flash 3 when causing the flash 3 to perform rear curtain firing synchronization in the case where the shooting mode of the camera 1 is the long exposure mode (bulb shooting mode) will be described using the flowchart of FIG. 5. In rear curtain firing synchronization, it is necessary to fire the flash 3 immediately before the completion of shooting. As mentioned previously, in the bulb shooting mode, the user is able to complete the shooting at any timing, and thus it is not possible for the main control unit 104 to know the timing at which shooting will be completed in advance.

Figure 5:
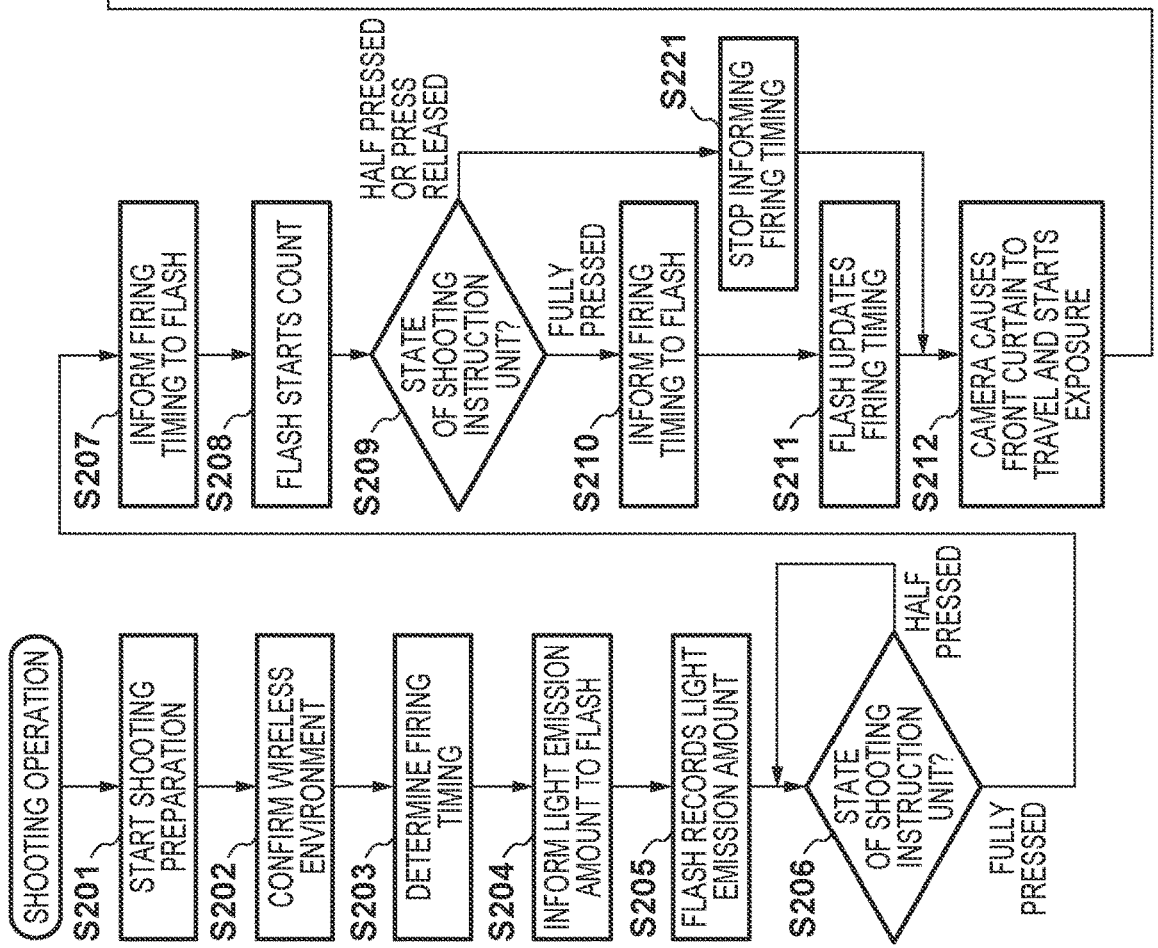
FIG. 5 is a flowchart of shooting operations in the case of rear curtain firing synchronization according to a first embodiment.

The operations shown in FIG. 5 can be started when a change to the half-pressed state (switch SW1 is ON) is detected from a state in which the shooting instruction unit 110 of the camera 1 is not being pressed (switch SW1 and SW2 are OFF). Note that, here, wireless communication between the camera 1 and the flash 3 is assumed to have been established.

In step S201, the main control unit 104 starts shooting preparation processing. The shooting preparation processing includes processing relating to AF and AE. For example, the main control unit 104 is able to execute AF and AE processing based on evaluation values generated by the signal processing unit 204 from the frame images of a moving image that is being shot in order to cause the display unit 103 to function as an EVF in a shooting standby state. Note that since AF and AE processing can be realized by known methods, a detailed description thereof is omitted. Here, the main control unit 104, in AE processing, is assumed to also determine the light emission amount of the flash, in addition to shooting conditions such as aperture, shutter speed and photographic sensitivity. The light emission amount of the flash may, however, be determined at another timing, such as being determined based on the result of firing a pre-flash after the shooting start instruction. When the shooting preparation processing ends, the main control unit 104 advances the processing to step S202.

In step S202, the main control unit 104 executes processing for confirming the wireless communication state between the camera 1 and the flash 3. Specifically, the main control unit 104 transmits a command to the flash 3, receives a response that is transmitted by the flash 3 in response to the command, and detects information relating to the communication state, such as the time required for communication with the flash 3.

In step S203, the main control unit 104 determines a transmission interval of a command (firing command) for instructing the firing timing to the flash 3 and the firing timing to be instructed in the firing command, based on the communication time detected in step S202. In the present embodiment, the firing timing instructed in the firing command represents a time period. In addition, the flash 3 is configured to start clocking processing when a firing command is received, and fire (i.e., emit light) when a time period represented by the firing timing instructed in the firing command elapses. Also, the flash 3, in the case where a new firing command is received during clocking processing, is assumed to reset the elapsed time to 0 at that point and restart the clocking processing.

The shortest time required from when a command is transmitted to the flash 3 until when a response, detected in step S202, is received is assumed to be n [msec]. In this case, the main control unit 104 is able to determine the firing timing that is instructed with a firing command to be n [msec] after the reception time of the firing command, and to determine the transmission interval of the firing command to be n/2 [msec]. Note that the firing timing can be determined to be a value greater than n/2 [msec] and the transmission interval of the firing command can be determined to be a value equal to or less than n/2 [msec]. The time period represented by the firing timing that is informed in the firing command is a fixed value irrespective of the transmission timing of the firing command. Note that, in the case where the wireless communication state is not favorable, the time period indicating the firing timing may be increased over the case where the wireless communication state is favorable, with consideration for the possibility that one or more firing commands will not be received.

In step S204, the main control unit 104 informs the amount of light emission determined in step S201 to the flash 3 (flash control unit 302).

In step S205, the flash control unit 302 stores the informed amount of light emission in the memory within the flash control unit 302, for example.

In step S206, the main control unit 104 confirms the state of the shooting instruction unit 110.

The main control unit 104 repeatedly executes step S206 if the half-pressed state is continued, and advances the processing to step S207 if the fully-pressed state is detected. Note that in the case where both the half-pressed state and the fully-pressed state are no longer detected, the processing of FIG. 5 is ended.

In step S207, the main control unit 104 starts transmission of the firing command to the flash 3. The firing command is a command that informs the firing timing, specifically, a time period after which the flash to fire (i.e., emit light).

In step S208, the flash control unit 302 starts the clocking operation (e.g., up-counting or down-counting) when the firing timing is stored in the memory within the flash control unit 302, for example. The flash control unit 302 is configured to fire the light emitting unit 301 based on the amount of light emission that is stored, when the time period informed in the firing command elapses. On the other hand, in the case where, after starting the clocking operation as a result of receiving a firing command, a new firing command is received before the time period informed in the firing command elapses, the flash control unit 302 resets the clocking operation, and again starts the clocking operation based on the new firing command.

In step S209, the main control unit 104 confirms the state of the shooting instruction unit 110.

The main control unit 104 advances the processing to step S210 if the fully-pressed state is continued, and advances the processing to step S221 if the fully-pressed state is released. Note that the case where the fully-pressed state is released is the case where the half-pressed state or both the half-pressed state and fully-pressed state are not detected (pressing released state). In step S221, the main control unit 104 stops informing of the firing timing (transmission of the firing command) started in step S207, and advances the processing to step S212.

In step S210, the main control unit 104 transmits the firing command to the flash 3 similarly to step S207. As described above, the firing command is transmitted at an interval such that the next firing command is received by the flash 3 before the clocking operation based on the firing command transmitted immediately before is completed. Thus, in S211, the flash control unit 302 resets the clocking operation based on the firing command transmitted by the main control unit 104 in step S210. The firing timing is thereby updated.

In step S212, the main control unit 104 causes the front curtain of the shutter 102 to travel through the shutter control unit 203, and starts exposure of the image sensor 101.

In step S213, the main control unit 104 confirms the state of the shooting instruction unit 110.

The main control unit 104 advances the processing to step S214 if the fully-pressed state is continued, and advances the processing to step S217 if the fully-pressed state has been released.

Steps S214 and S215 involve the same processing as steps S210 and S211.

In step S216, the main control unit 104 confirms the state of the shooting instruction unit 110 before the firing timing arrives, and returns the processing to step S214 if the fully-pressed state is continued. In this way, in the bulb shooting mode, transmission of the firing command from the camera 1 to the flash 3 is repeatedly executed, while the fully-pressed state of the shooting instruction unit 110 (input of the shooting start instruction) is continued. The flash 3 updates (delays) the firing timing whenever the firing command is received.

In step S217, the main control unit 104 stops informing of the firing timing (transmission of the firing command) started in step S207, and advances the processing to step S218. Note that if step S221 has already been executed, step S217 may be skipped.

In step S218, the flash control unit 302 fires the light emitting unit 301 when elapse of a time period corresponding to the firing timing informed in the firing command can be confirmed, by clocking processing that is based on the firing command received most recently.

In step S219, the main control unit 104 causes the rear curtain of the shutter 102 to travel through the shutter control unit 203, based on the firing timing informed with the firing command last transmitted to the flash 3, and ends exposure of the image sensor 101. Note that since exposure is definitely ended after firing of the flash 3, travel of the rear curtain may be started after receiving a response indicating that firing is completed from the flash 3.

In step S220, the main control unit 104 executes post-processing of the shutter 102 and shooting end processing such as signal processing and recording processing on the shot image, and completes the shooting.

Figure 6:
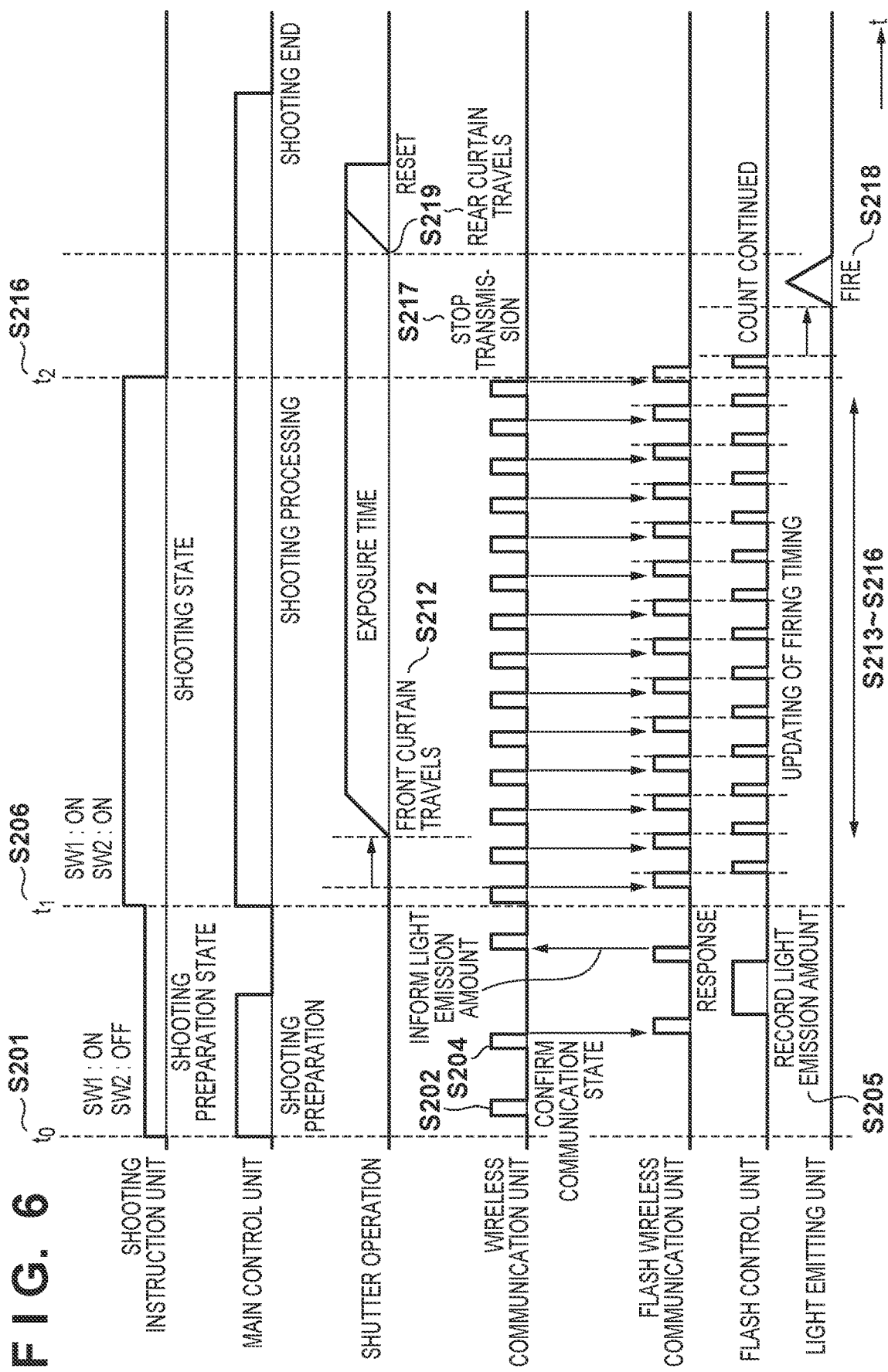
FIG. 6 is a timing chart corresponding to the flowchart of FIG. 5.

FIG. 6 is the timing chart showing operations of the camera 1 and the flash 3 and the timing thereof in the case where the fully-pressed state of the shooting instruction unit 110 is continued from steps S206 to S216 in the flowchart of FIG. 5.

As shown in FIG. 6, in the present embodiment, informing of the firing timing from the camera 1 to the flash 3 is repeatedly executed and the firing timing of the flash is continually updated, until time t2 up to which point the fully-pressed state continues after the shooting instruction unit 110 enters the fully-pressed state at time t1. The flash 3 is thereby controlled so as to not fire at an earlier timing than intended by the user. Then, when the fully-pressed state of the shooting instruction unit 110 is released at time t2, control is performed so as to not inform the firing timing from the camera 1 to the flash 3 thereafter. The flash 3 thereby fires after the time period informed as the firing timing in the firing command elapses from when the firing command was last received. In other words, the flash 3 fires based on the last firing command that has been transmitted at the point in time at which the user stops fully pressing the shooting instruction unit 110 in the bulb shooting mode. Thus, the flash 3 can be fired and exposure can be ended at a timing closer to that intended by the user than with a configuration that transmits the firing command after it is detected that the user has stopped fully pressing the shooting instruction unit 110. Accordingly, high-precision rear curtain firing synchronized shooting in the bulb shooting mode can be realized.

Second Embodiment

Next, a second embodiment of the present invention will be described. Since the proportion of time required for wireless communication relative to the exposure time decreases in the case where exposure time is long, the influence of a delay in the firing timing caused by wireless communication decreases relatively. Accordingly, in the present embodiment, in the case where the exposure time is equal to or greater than a time determined in advance, the power consumption of the camera 1 and the flash 3 is reduced by lowering the frequency with which the firing timing is informed.

Figure 7:
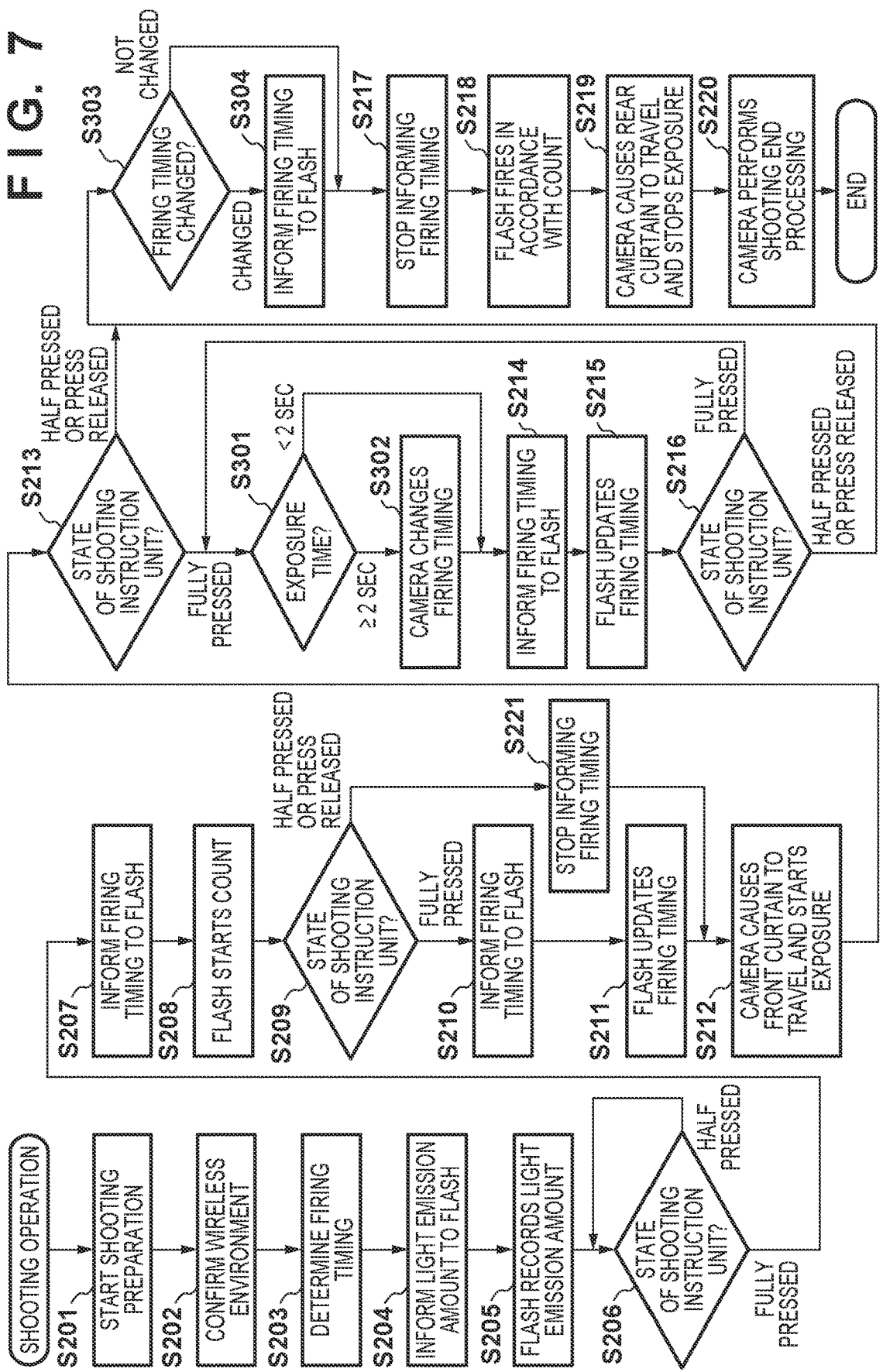
FIG. 7 is a flowchart of shooting operations in the case of rear curtain firing synchronization according to a second embodiment.

In the present embodiment, only the operations of the camera 1 (main control unit 104) differ from the first embodiment, and thus description relating to the configuration of the camera 1 and the flash 3 is omitted. Hereinafter, the operations of the camera 1 and the flash 3 at the time of performing rear curtain firing synchronization of the flash 3 in the case where the shooting mode of the camera 1 is the long exposure mode (bulb shooting mode) will be described using the flowchart of FIG. 7. In FIG. 7, the same reference numerals as FIG. 5 are given to steps for performing similar operations to the first embodiment, and description thereof is omitted.

In the present embodiment, the processing up to step S213 is basically similar to the first embodiment. In the present embodiment, however, it is assumed that when exposure of the image sensor 101 is started in step S212, the main control unit 104 starts measurement of the exposure time.

In step S213, the main control unit 104 confirms the state of the shooting instruction unit 110.

The main control unit 104 advances the processing to step S301 if the fully-pressed state is continued, and advances the processing to step S303 if the fully-pressed state has been released.

In step S301, the main control unit 104 confirms whether the present exposure time is less than or equal to a time determined in advance. Here, the time determined in advance is assumed to be 2 seconds. The main control unit 104 advances the processing to step S302 if the exposure time is 2 seconds or more, and to step S214 if the exposure time is less than 2 seconds.

In step S302, the main control unit 104 changes the firing timing determined in step S203 to a longer time period. The time period can be changed to be longer than or shorter than the time determined in advance used in step S301. The time period may even be changed to be infinity. Also, the main control unit 104 changes the informing interval of the firing timing (transmission interval of the firing command) according to the changed firing timing (i.e., changed time period). The informing interval (transmission interval) can be extended within the range in which the firing timing is updated before the clocking operation that is based on the changed firing timing of the flash 3 ends, while the fully-pressed state of the shooting instruction unit 110 is continuing. The transmission frequency is preferably as low as possible from the viewpoint of reducing power consumption.

Thereafter, steps S214 to S216 are similar to the first embodiment. However, the firing timing that is informed in the firing command transmitted in step S214 after the exposure time has reached 2 seconds or more is the firing timing changed in step S302. When release of the fully-pressed state is detected in step S216, the main control unit 104 advances the processing to step S303.

In step S303, the main control unit 104 confirms whether the firing timing has changed (whether step S302 was executed), and advances the processing to step S304 if changed and to step S217 if not changed.

In step S304, the main control unit 104 informs the firing timing to the flash 3. The firing timing informed here is the firing timing determined in step S203 before being changed in step S302.

The processing from step S217 onward is similar to the first embodiment, and description thereof is omitted.

Figure 8:
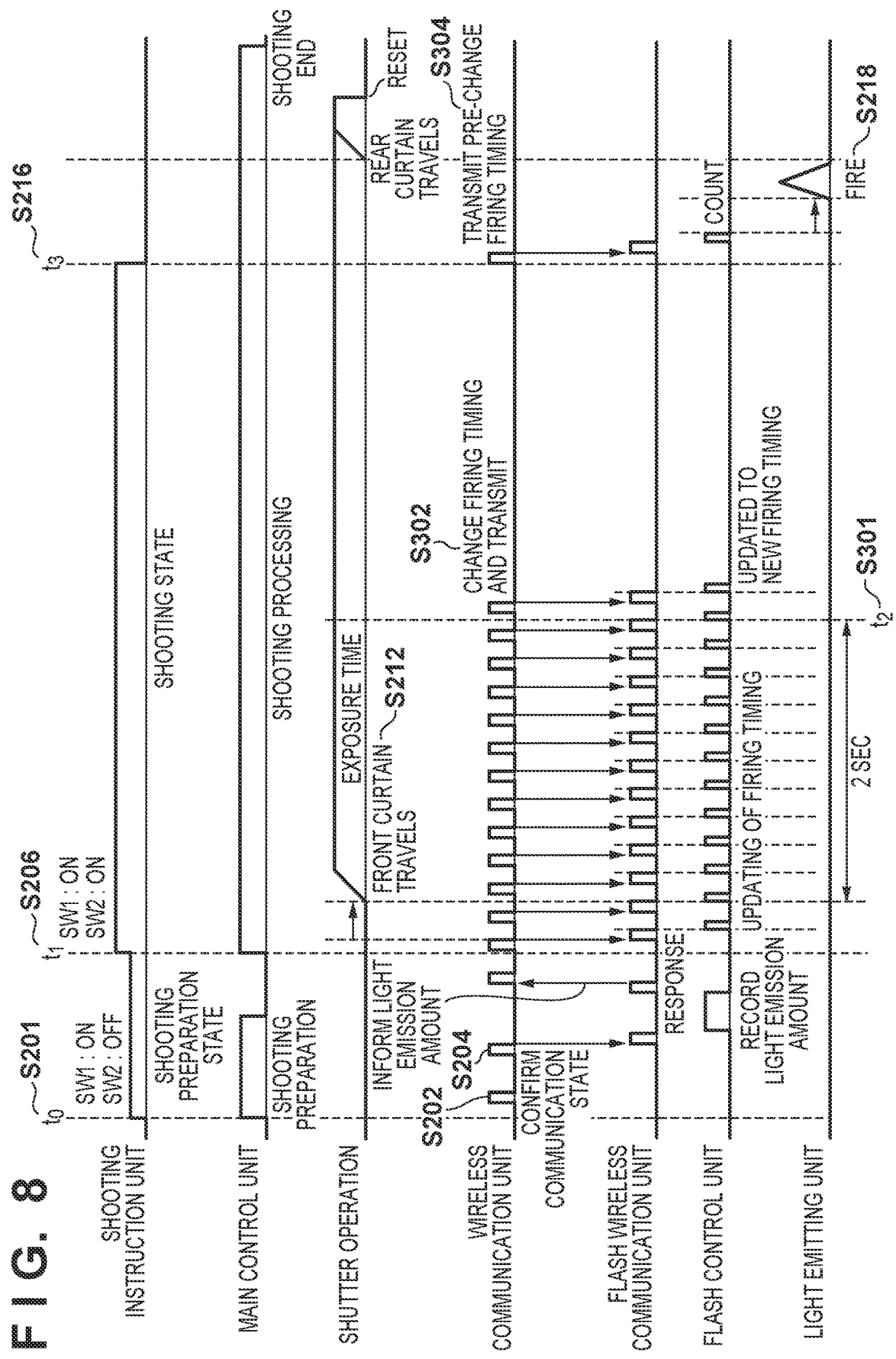
FIG. 8 is a timing chart corresponding to the flowchart of FIG. 7.

FIG. 8 is a similar timing chart to FIG. 6 in the first embodiment. Here, the case where the fully-pressed state of the shooting instruction unit 110 is released during the time from when the firing timing is changed in step S302 until when the next firing command is transmitted is shown.

As described above, according to the present embodiment, the configuration of the first embodiment is changed so as to extend both an interval of firing timings and an interval of informing a firing timing, in the case where the exposure time is equal to or greater than a time determined in advance. The frequency of communication between the camera and the flash that is executed during the exposure period can thereby be lowered, and the power consumption of the camera and the flash can be reduced. Also, a configuration is adopted in which the original firing timing is informed when the fully-pressed state of the shooting instruction unit is released, thus enabling delay of the firing timing to be reduced.

Third Embodiment

Next, a third embodiment of the present invention will be described. The first and second embodiments were configured such that the camera 1 controls the firing timing of the wirelessly connected flash 3. The present embodiment relates to a configuration in which a flash attached to the camera 1 controls the firing timing of a wirelessly connected flash.

Figure 9:
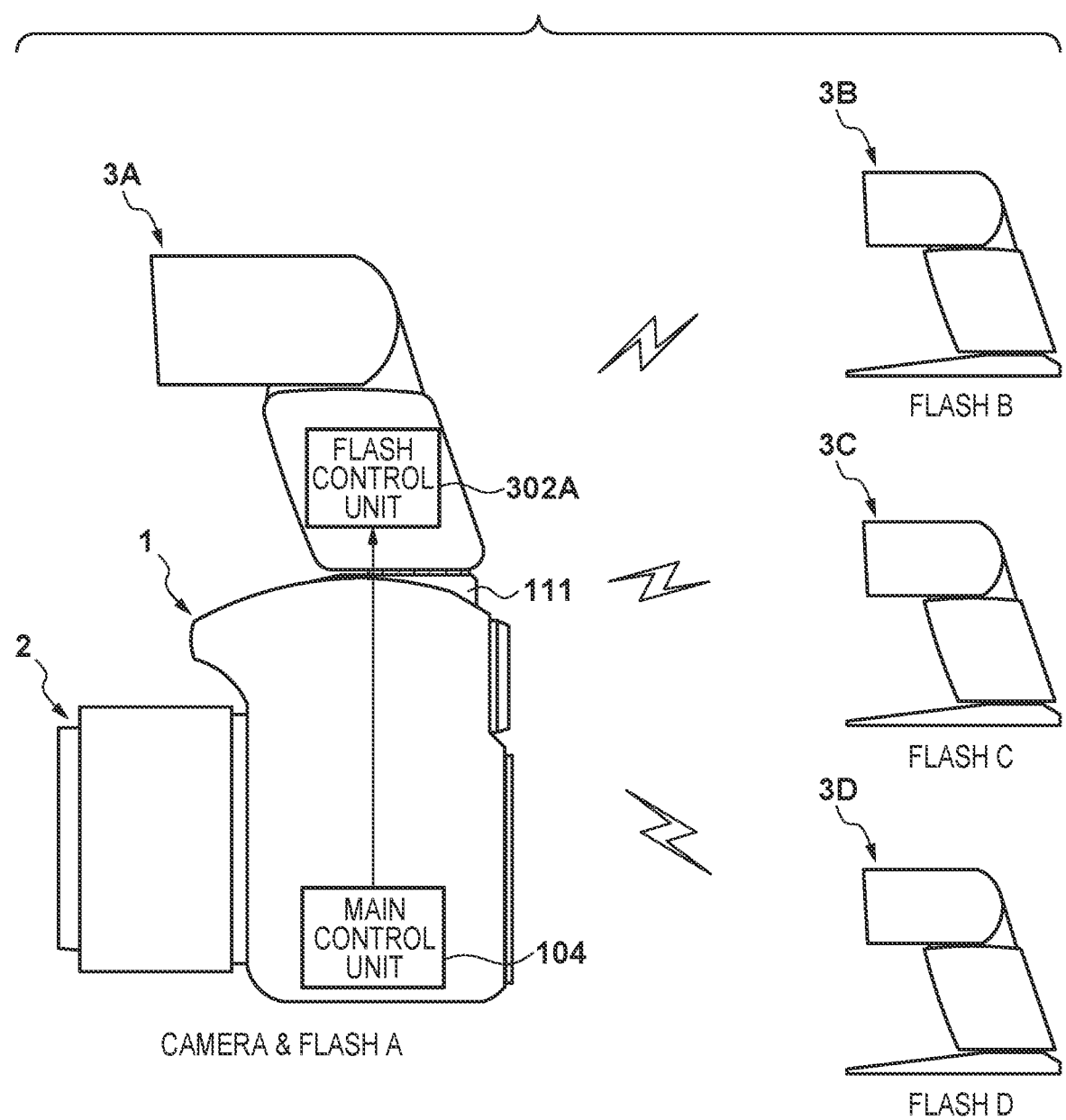
FIG. 9 is a system configuration diagram in the case of performing an informing method by a flash 3.

FIG. 9 is a diagram schematically showing an exemplary configuration of an image capture system capable of carrying out the present embodiment. The image capture system shown in FIG. 9 has four flashes 3A to 3D having the same configuration as the flash 3 described earlier. Also, the flash 3A is mounted on the flash mounting unit 111 of the camera 1, and the main control unit 104 communicates with a flash control unit 302A of the flash 3A through a contact of the flash mounting unit 111. Also, the flashes 3B to 3D installed in positions at a distance from the camera 1 communicate wirelessly with the flash 3A. Note that the flash 3A mounted on the camera 1 is called the main flash (or master flash), and the flashes 3B, 3C and 3D that are managed and controlled by the flash 3A are called child flashes (or slave flashes). Note that the number of child flashes need only be 1 or more. In the following description, in order to distinguish the elements of the flashes 3A to 3D that have the same configuration, the suffixes A to D are added to the end of reference numerals. For example, the flash control unit included in the flash 3B will be 302B.

Figure 10:
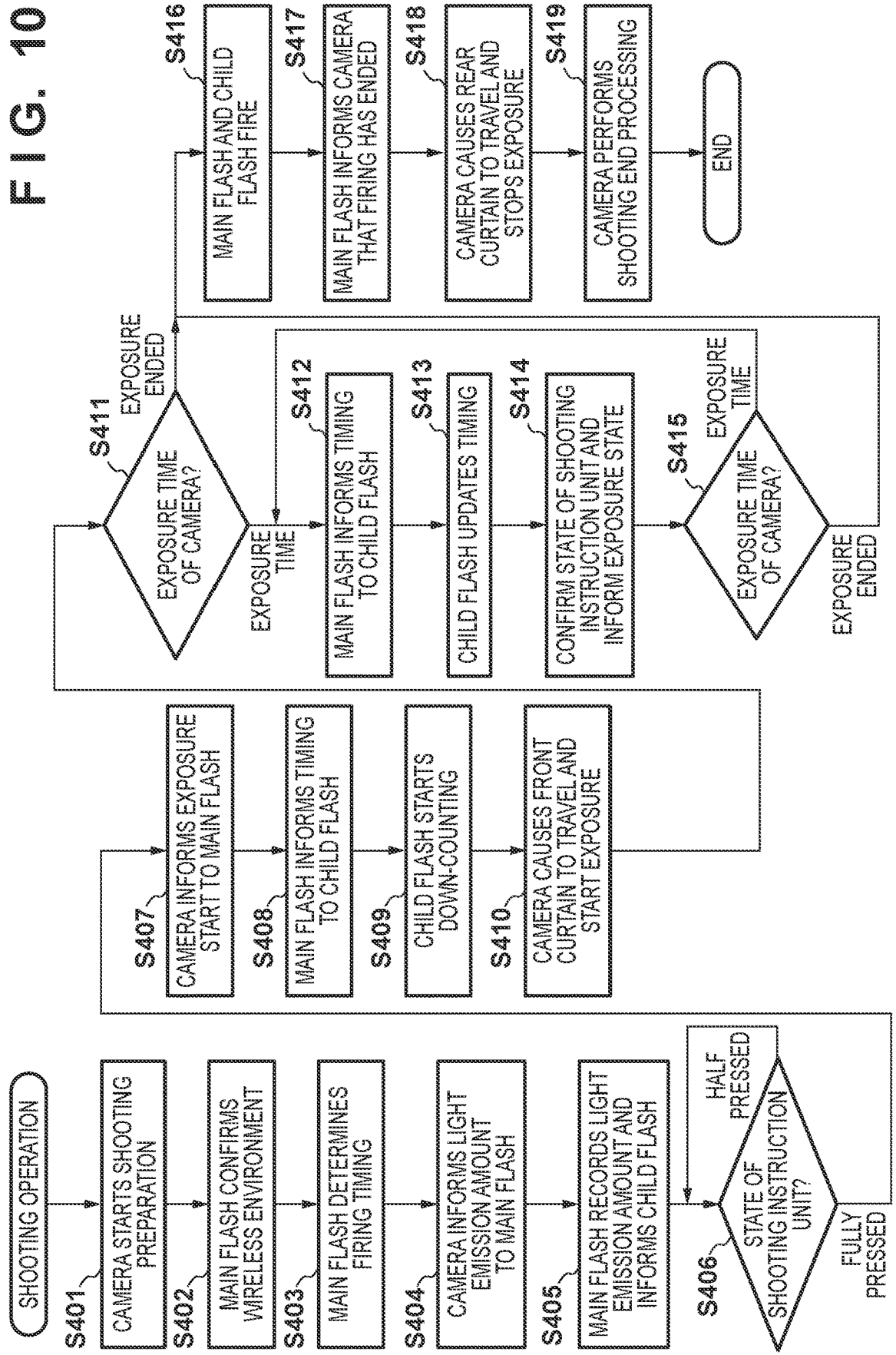
FIG. 10 is a flowchart of shooting operations in the case of rear curtain firing synchronization according to a third embodiment.

FIG. 10 is a flowchart relating to the operations of the camera 1 and the flashes 3A to 3D when the main flash 3A performs rear curtain firing synchronization control in the bulb shooting mode that uses the child flashes 3A to 3D. In FIG. 10, processes in which the operations are performed by the camera, processes in which the operations are performed by the main flash, and processes in which the operations are performed by the child flashes are respectively executed by the main control unit 104, the flash control unit 302A and the flash control units 302B to 302D controlling the other constituent elements as needed.

In step S401, the main control unit 104 starts shooting preparation processing similarly to step S201. Also, the main control unit 104 instructs the flash control unit 302A of the main flash 3A to perform shooting preparation.

In step S402, the flash control unit 302A executes processing for confirming the state of wireless communication with the child flashes 3B to 3D, in a similar manner to the processing that is performed by the main control unit 104 in step S202. The flash control unit 302A detects information relating to the communication state, such as the time required for communication with the individual child flashes 3B to 3D.

In step S403, the flash control unit 302A determines the transmission interval of the command (firing command) for instructing the firing timing to the child flashes 3B to 3D and the firing timing to be instructed, based on the communication time detected in step S402. For example, the flash control unit 302A is able to determine the firing timing based on the longest time, among the communication times detected for the child flashes 3B to 3D. The flash control unit 302A informs the determined firing timing to the main control unit 104.

In step S404, the main control unit 104 informs the amount of light emission determined based on the shooting preparation processing executed in step S401 to the flash control unit 302A.

In step S405, the flash control unit 302A stores the informed amount of light emission in the memory of the main flash, and informs the amount of light emission to the child flashes 3B to 3D through the flash wireless communication unit 303A.

In step S406, the main control unit 104 confirms the state of the shooting instruction unit 110.

The main control unit 104 repeatedly executes step S406 if the half-pressed state is continued, and advances the processing to step S407 if the fully-pressed state is detected. Note that in the case where both the half-pressed state and the fully-pressed state are no longer detected, the processing of FIG. 10 is ended.

In step S407, the main control unit 104 informs the exposure start to the flash control unit 302A.

In step S408, the flash control unit 302A starts transmission to the child flashes 3B to 3D of the firing command informing the firing timing determined in step S403. Also, the flash control unit 302A stores the firing timing in the memory of the main flash 3A, and starts clocking processing.

In step S409, the flash control units 302B to 302D of the child flashes 3B to 3D that received the firing command store the informed firing timing in memory and start the clocking processing.

In step S410, the main control unit 104 causes the front curtain of the shutter 102 to travel in accordance with the timing informed to the flash control unit 302A, and starts exposure of the image sensor 101.

In step S411, the flash control unit 302A confirms whether the camera 1 is performing exposure, and advances the processing to step S412 if performing exposure and to step S416 if informed of the end of exposure.

In step S412, the flash control unit 302A transmits a firing command to the child flashes 3B to 3D. Also, the flash control unit 302A updates the firing timing of the main flash 3A, and resets and restarts the clocking processing.

In step S413, the flash control units 302B to 302D update the firing timing based on the received firing command, and reset and restart the clocking processing.

In step S414, the main control unit 104 confirms the state of the shooting instruction unit 110, and informs the flash control unit 302A that exposure is being performed if the fully-pressed state is maintained and that exposure has ended if the fully-pressed state has been released.

In step S415, the flash control unit 302A confirms whether exposure is continuing, based on informing by the main control unit 104, and returns to step S412 if exposure is continuing, and repeatedly executes transmission of the firing command to the child flashes 3B to 3D. On the other hand, if exposure has ended, the flash control unit 302A advances the processing to step S416.

Updating of the firing timing is no longer performed, due to leaving the processing loop of steps S412 to S415. When a time period corresponding to the firing timing elapses from when the flash control units 302A to 302D last started the clocking processing, the flash control units 302A to 302D fire the light emitting units 301A to 301D at step S416. The flash control units 302B to 302D of the child flashes 3B to 3D inform the end of firing to the flash control unit 302A of the main flash 3A.

In step S417, the flash control unit 302A of the main flash 3A informs the main control unit 104 that firing of all the flashes is completed. Note that the flash control unit 302A may inform the main control unit 104 only that firing of the main flash 3A is completed, without waiting to be informed by the child flashes 3B to 3D that firing is completed.

In step S418, the main control unit 104 causes the rear curtain of the shutter 102 to travel through the shutter control unit 203, and completes the exposure of the image sensor 101.

In step S419, the main control unit 104 executes post-processing of the shutter 102 and shooting end processing such as signal processing or recording processing of the shot image, and completes the shooting.

According to the present embodiment, a configuration is adopted in which, in the case where the flash mounted on the camera had a function of communicating wirelessly with a wireless flash, the flash mounted on the camera executes firing control of the wireless flash. Similar effects to the first and second embodiments can also be realized according to the present embodiment. Also, the present embodiment is advantageous in that the processing load of the control unit of the camera is reduced.

Other Embodiments

In the above-described embodiments, shooting in the bulb shooting mode in which exposure is continued while the fully-pressed state of the shooting instruction unit (e.g., shutter button) is continued was described as an example of the case where the exposure period (shutter speed) cannot be specified at the start of shooting. However, the present invention can be applied to shooting in which the exposure period (shutter speed) cannot be specified at the start of shooting, without being limited to shooting in a specific shooting mode. For example, the present invention is also applicable to shooting in which the exposure period ends according to a condition that is different from the state of the shooting instruction unit, such as a predetermined external input being received or information acquirable with the image capture apparatus satisfying a predetermined condition.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-90108, filed on May 8, 2018, which is hereby incorporated by reference herein in its entirety.

What is claimed is:

1. A flash control device for controlling a flash according to exposure of an image capture apparatus, the flash control device comprising:
   a wireless communication interface;
   one or more processors that executes a program stored in a memory and, when executing the program, operates as:
   (1) a transmitting unit configured to inform the flash of a firing timing via the wireless communication interface; and
   (2) a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied,
   wherein an informing interval of the firing timing is shorter than a time that is informed as the firing timing.

2. The flash control device according to claim 1, wherein the firing timing represents a fixed value.

3. The flash control device according to claim 1, wherein the firing timing is determined based on a time required for wireless communication with the flash.

4. The flash control device according to claim 1, wherein informing of the firing timing includes an instruction for firing after a fixed time from when the firing timing is received.

5. The flash control device according to claim 1, wherein the controlling unit:
   lengthens the informing interval of the firing timing and increases a value represented by the firing timing when the exposure period becomes equal to or greater than a time determined in advance, and
   informs a firing timing determined before the increasing to the flash when a condition for ending the exposure period is satisfied.

6. The flash control device according to claim 1, wherein the flash is mounted on the image capture apparatus.

7. An image capture apparatus comprising:
   a flash control device; and
   driving circuitry that drives a front curtain and a rear curtain of a shutter,
   wherein the flash control device comprises:
   (A) a wireless communication interface; and
   (B) one or more processors that executes a program stored in a memory and, when executing the program, operates as:
   (1) a transmitting unit configured to inform the flash of a firing timing via the wireless communication interface; and
   (2) a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied, and
   wherein the driving circuitry drives, after the controlling unit stops informing of the firing timing, the rear curtain and causes the exposure period to end.

8. The image capture apparatus according to claim 7, wherein the driving circuitry drives the rear curtain after the image capture apparatus is informed from the flash that firing is completed.

9. The image capture apparatus according to claim 7, wherein the shooting mode with an indefinite exposure period is a bulb shooting mode.

10. The image capture apparatus according to claim 7, wherein the condition for ending the exposure period of the image capture apparatus is release of a fully-pressed state of a shutter button included in the image capture apparatus.

11. A flash comprising:
    a light emitting device;
    a wireless communication interface; and
    one or more processors that executes a program stored in a memory and, when executing the program, operates as a firing control unit configured to control operations of the light emitting device,
    wherein the firing control unit causes clocking processing to start whenever a notification of firing timing is received via the wireless communication interface, and causes the light emitting device to emit light when a time corresponding to the firing timing elapses, and
    wherein the firing control unit causes the clocking processing to restart if, after a notification of firing timing is received and before the time corresponding to the firing timing elapses, another notification of firing timing is received.

12. An image capture system comprising:
an image capture apparatus and a flash that are connected in a wireless communicable manner,
wherein the image capture apparatus comprises: (a) a flash control device; and (b) driving circuitry that drives a front curtain and a rear curtain of a shutter,
wherein the flash control device comprises:
(A) a wireless communication interface; and
(B) one or more processors that executes a program stored in a memory and, when executing the program, operates as:
(1) a transmitting unit configured to inform the flash of a firing timing via the wireless communication interface; and
(2) a controlling unit configured to control, in a case where a shooting mode of the image capture apparatus is a shooting mode with an indefinite exposure period, the transmitting unit to repeatedly inform the firing timing during an exposure period of the image capture apparatus and to stop informing the firing timing if a condition for ending the exposure period of the image capture apparatus is satisfied,
wherein the driving circuitry drives, after the controlling unit stops informing of the firing timing, the rear curtain and causes the exposure period to end,
wherein the flash comprises: (a) a light emitting device; (b) a wireless communication interface; and (c) one or more processors that executes a program stored in a memory and, when executing the program, operates as a firing control unit configured to control operations of the light emitting device, and
wherein the firing control unit causes clocking processing to start whenever a notification of firing timing is received via the wireless communication interface, and causes the light emitting device to emit light when a time corresponding to the firing timing elapses.

13. A flash control method for controlling a flash according to exposure of an image capture apparatus, the method comprising:
determining if a shooting mode of the image capture apparatus is a shooting mode with an indefinite exposure period; and
in a case where a shooting mode of the image capture apparatus is a shooting mode with an indefinite exposure period:
(1) repeatedly informing the flash of a firing timing by wireless communication during an exposure period of the image capture apparatus; and
(2) stopping informing of the firing timing when a condition for ending the exposure period of the image capture apparatus is satisfied,
wherein an informing interval of the firing timing is shorter than a time that is informed as the firing timing.

* * * * *